(12) United States Patent
Ding et al.

(10) Patent No.: US 11,520,899 B2
(45) Date of Patent: Dec. 6, 2022

(54) SYSTEM AND METHOD FOR MACHINE LEARNING ARCHITECTURE WITH ADVERSARIAL ATTACK DEFENSE

(71) Applicant: ROYAL BANK OF CANADA, Montreal (CA)

(72) Inventors: Weiguang Ding, Toronto (CA); Luyu Wang, Toronto (CA); Ruitong Huang, Toronto (CA); Xiaomeng Jin, Toronto (CA); Kry Yik Chau Lui, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 873 days.

(21) Appl. No.: 16/416,057

(22) Filed: May 17, 2019

(65) Prior Publication Data

US 2019/0354688 A1    Nov. 21, 2019

Related U.S. Application Data

(60) Provisional application No. 62/672,763, filed on May 17, 2018.

(51) Int. Cl.
| | | |
|---|---|---|
| *G06F 21/57* | (2013.01) | |
| *G06N 3/08* | (2006.01) | |
| *G06N 3/04* | (2006.01) | |
| *G06N 7/04* | (2006.01) | |

(52) U.S. Cl.
CPC .......... *G06F 21/577* (2013.01); *G06N 3/0454* (2013.01); *G06N 3/084* (2013.01); *G06N 7/046* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 10,593,043 | B2 * | 3/2020 | Lin | .................... G06N 3/08 |
| 2019/0188562 | A1 * | 6/2019 | Edwards | ................ G06N 3/04 |
| 2019/0325134 | A1 * | 10/2019 | Gronát | ................ G06N 3/084 |
| 2020/0401869 | A1 * | 12/2020 | Baker | ................ G06N 20/20 |

OTHER PUBLICATIONS

Ma et al., "Characterizing Adversarial Subspaces Using Local Intrinsic Dimensionality," ICLR, 2018, 15pg. (Year: 2018).*
Xu et al., "Feature Squeezing: Detecting Adversarial Examples in Deep Neural Networks," NDSS, 2018, 15pg. (Year: 2018).*

* cited by examiner

*Primary Examiner* — Ryan D. Coyer
(74) *Attorney, Agent, or Firm* — Norton Rose Fulbright Canada LLP

(57) ABSTRACT

A platform for training deep neural networks using push-to-corner preprocessing and adversarial training. A training engine adds a preprocessing layer before the input data is fed into a deep neural network at the input layer, for pushing the input data further to the corner of its domain.

20 Claims, 4 Drawing Sheets

SYSTEM AND METHOD FOR MACHINE LEARNING ARCHITECTURE WITH ADVERSARIAL ATTACK DEFENSE

CROSS-REFERENCE TO RELATED APPLICATIONS

This application claims all benefit including priority to U.S. Provisional Patent Application 62/672,763, filed May 17, 2018, and entitled: "PUSH-TO-CORNER DEFENCE AGAINST ADVERSARIAL ATTACKS", the entirety of which is hereby incorporated by reference.

FIELD

The present disclosure generally relates to the field of machine learning and particularly, some embodiments relate to the field of systems and methods for training, providing, and/or using machine learning architectures for defence against adversarial attacks.

INTRODUCTION

Embodiments described herein relate to cybersecurity or IT security platforms to protect computing resources from damage, disruption or other harm. Machine learning can involve neural networks, such as deep neural networks. Deep neural networks can be fooled to make wrong predictions on inputs that are carefully crafted to be perturbed. Deep neural networks are vulnerable to adversarial attacks. Other types of adversarial attacks are also possible, such as attacks targeting tasks other than classifications, or attacks targeting the internal representation of a neural net. Such possibility imposes a security concern relating to malicious activities targeting deep learning systems.

SUMMARY

In accordance with an aspect, there is provided a platform with a processor and a memory storing machine executable instructions to configure the processor to train a deep neural network using push-to-corner preprocessing and adversarial training.

In accordance with an aspect, there is provided a platform with a processor and a memory storing machine executable instructions to configure the processor to: receive a neural network and input data; process the input data using a preprocessing layer to generate input space saturation data; generate output data by a forward pass of the input space saturation data through the neural network; generate adversarial attack data by backpropagation of gradients to the output data; and train the neural network using the adversarial attack data.

In some embodiments, the preprocessing layer is configured to generate the input space saturation data by pushing the input data further to the corner of its domain.

In some embodiments, the preprocessing layer is configured to generate the input space saturation data by pushing the input data towards near the corner of the high dimensional space.

In accordance with an aspect, there is provided a computer implemented system for conducting machine learning with adversarial training. The system includes: at least one memory for storing neural network data for defining a neural network having a plurality of nodes in a plurality of layers, the plurality of nodes configured to receive an plurality of inputs and to generate one or more outputs based on the neural network data. The at least one processor is configured for: receiving a first training input data set for training the neural network; transforming the first training input data set with a saturation function to generate a saturated data set with values pushed toward corners of domains of the input data set; inputting the saturated data set into the neural network and generating saturated data backpropagation gradients based on the resulting one or more outputs of the neural network; and generating a second training data set based on the training input data set and the saturated data backpropagation gradients.

In accordance with an aspect, there is provided a computer implemented method for conducting machine learning with adversarial training. The method includes: receiving a first training input data set for training a neural network defined by neural network data stored in at least one memory, the neural network having a plurality of nodes in a plurality of layers, the plurality of nodes configured to receive an plurality of inputs and to generate one or more outputs based on the neural network data; transforming, with at least one processor, the first training input data set with a saturation function to generate a saturated data set with values pushed toward corners of domains of the input data set; inputting the saturated data set into the neural network and generating, with the at least one processor, saturated data backpropagation gradients based on the resulting one or more outputs of the neural network; and generating, with the at least one processor, a second training data set based on the training input data set and the saturated data backpropagation gradients.

In accordance with an aspect, there is provided a non-transitory computer-readable medium or media having stored thereon neural network data defining a neural network having a plurality of nodes in a plurality of layers, the plurality of nodes configured to receive an plurality of inputs and to generate one or more outputs based on the neural network data, the neural network trained on a training data set generated by: transforming an input data set with a saturation function to generate a saturated data set with values pushed toward corners of domains of the input data set; inputting the saturated data set into the neural network and generating saturated data backpropagation gradients based on the resulting one or more outputs of the neural network; and generating the training data set based on the input data set and the saturated data backpropagation gradients.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

In some situations, research has shown that small perturbations which may be imperceptible or ignored/disregarded by humans and result in incorrect results or classification by neural networks. As neural networks applications become more and more prevalent, approaches for developing and/or training machine learning architectures are becoming increasingly important.

While examples such as misclassifying panda bears as gibbons may seem inconsequential, the repercussions of other examples such as interpreting a sign showing a speed limit of 45 as a sign showing a speed limit of 75 are more pronounced. Similarly, misinterpreting numbers in financial transactions, exploiting decision making in loan decisions, confusing positive or negative answers or sentiments in audio or other natural language processing, misdiagnosing medical data and the like are additional examples illustrating where it may be beneficial to increase the robustness of a neural network to adversarial attacks.

In some embodiment, aspects of the present application push training values to the corners of their domains which may, in some situations, increase the robustness of a neural network (i.e. reduce misclassifications when adversarial inputs are inputted).

Embodiments of methods, systems, and apparatus are described through reference to the drawings.

Figure 1:
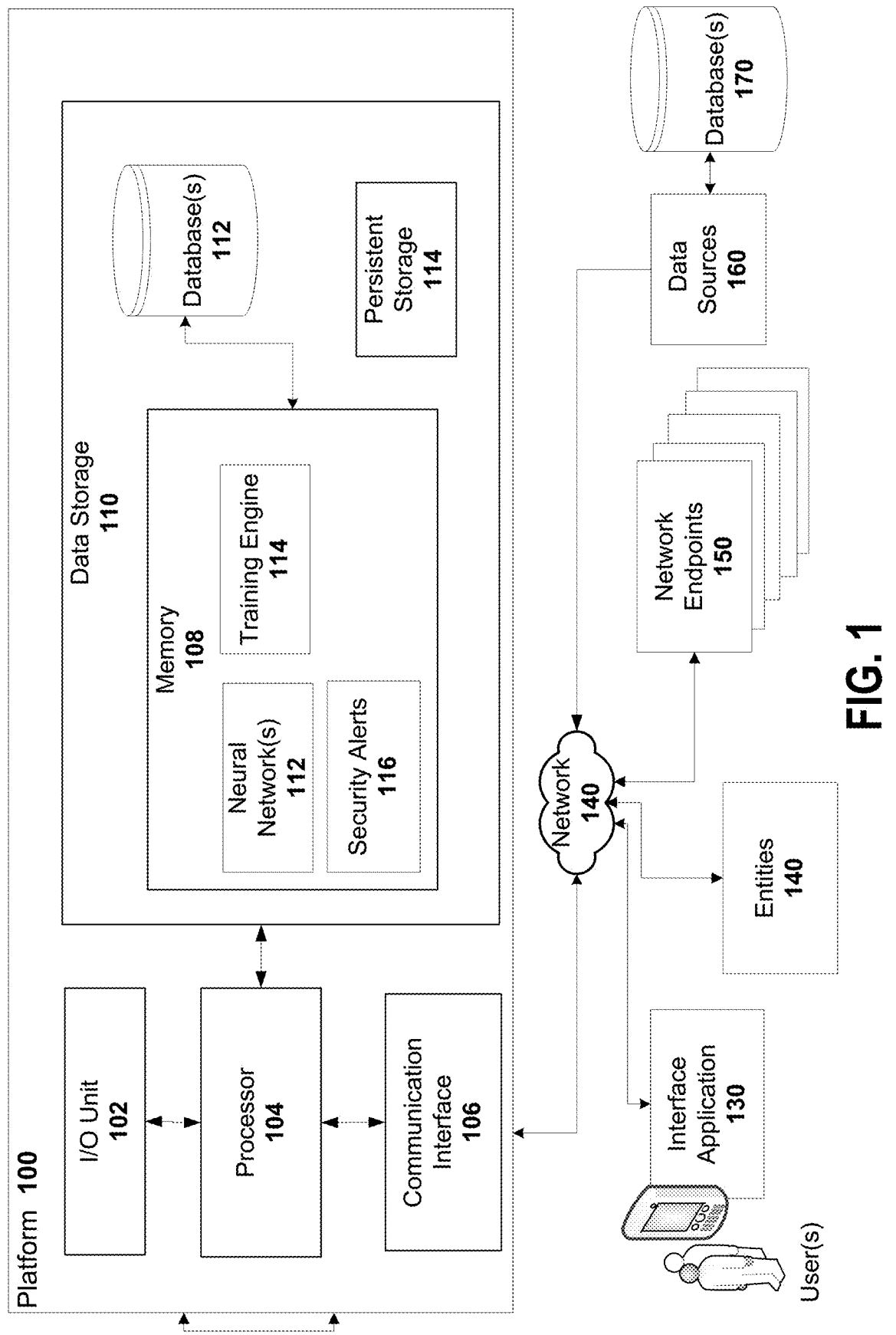
FIG. 1 is a schematic diagram of a platform according to some embodiments.

FIG. 1 is a schematic diagram show aspects of a system or platform 100 for training neural networks according to some embodiments. The platform 100 can implement aspects of the processes described herein for training neural networks 112. In some embodiments, the platform is a system including one or more computing devices.

Deep neural networks 112 (DNNs) can be vulnerable to adversarial attacks. Such attacks can be small and noise-like, and therefore negligible to human eyes. However, they can be carefully crafted so as to fool even the most advanced DNN models. Embodiments described herein can detect (and try to avoid) this kind of malicious attack. In some embodiments, the platform 100 has a robust training engine 114 for neural networks 112 (e.g. DNNs). In some embodiments, the platform 100 can trigger security alerts 116 relating to detected malicious attacks. In some embodiments, the platform 100 builds a robust DNN 112 by coupling push-to-corner preprocessing with adversarial attacks into the training data.

In some embodiments, the platform 100 connects to interface application 130, entities 140, network endpoints 150, and data sources 160 (with databases 170) using network 140. Entities 140, network endpoints 150, and data sources 160 (with databases 170) can interact with the platform 100 to provide input data and receive output data. Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements that can represent security alerts 116 or neural networks 112, for example.

The platform 100 can include an I/O Unit 102, a processor 104, communication interface 106, and data storage 110. The processor 104 can execute instructions in memory 108 to implement aspects of processes described herein. The processor 104 can execute instructions in memory 108 to configure neural networks 112 (e.g. DNNs), training engine 114, security alerts 116, and other functions described herein.

The platform 100 is configured for adversarily training neural networks 112 which can be received initially from entities 150, network endpoints 150, or data sources 160 (e.g., stored in the form of data sets at databases 170). The platform 100 includes a training engine 114. The training engine 114 may be software (e.g., code segments compiled into machine code), hardware, embedded firmware, or a combination of software and hardware, according to various embodiments. The training engine 114 is configured to receive or access one or more data sets representative of a neural network 112 model, and to train the neural network 112 with training data generated by pre-processing input data and adversarial attack data.

The neural network 112, training data and associated rules and adversarial approaches can be stored in data storage 110, which is configured to maintain one or more data sets, including data structures storing linkages of input data, output data, and training data. Data storage 150 may be a relational database, a flat data storage, a non-relational database, among others. In some embodiments, data storage 150 may store data representative of a model distribution set including one or more modified models based on a neural network 112 model. The communication interface 106 is configured to transmit data sets representative of the trained neural network 112, for example, to a target entity 140, network endpoint 150, or data source 160. The target data storage or data structure may, in some embodiments, reside on a computing device or system 140 such as a mobile device.

The platform 100 can implement a defence mechanism that might explore the property of the DNN 112 model itself. For example, model distillation and adversarial training can try to solve this problem by training DNNs (e.g. neural networks 112) with local smoothness or enhances decision boundaries to include as much attacks as possible. However, model distillation has been shown to be also vulnerable with a slightly modified way to generate attacks, while adversarial training might not achieve acceptable security level for real world applications.

Embodiments described herein implement a training engine 114 that uses a Push-To-Corner (e.g. pushing data to the corner of its domain) defence strategy to achieve high robustness against adversarial attacks. The platform 100 uses a pre-process on input data (or saturation function) to push the input data to the corner of its domain. The training engine 114 considers the input data distribution over the domain on the adversarial robustness. When pushing the data by saturation, towards near the corner of the high dimensional space, the classifier (e.g. neural network 112) adversarially trained using the training engine 114 will become more robust.

The training engine 114 investigates the property of the data domain and its effect on the adversarial robustness of the neural network 112 model trained on the dataset (e.g. stored in database 112).

The training engine 114 uses a differentiable preprocessing step that pushes the input data to the corner of its domain. The training engine 114 improves a robustness score for training DNNs 112. The training engine 114 uses additional computation on top of the DNN training.

The training engine 114 adds a preprocessing layer (see e.g. FIG. 2) before the training or input data is fed into the DNN (e.g. neural network 112) at the input layer. The preprocessing is for pushing the input data further to the corner of its domain. In some embodiments, the preprocessing can involve a saturation function. Given a data matrix X (e.g. input data), each entry can pass through the saturation function g as:

$$g(x_{ij}) = \text{sign}(x_{ij})|x_{ij}|^{\frac{2}{p}}$$

where p>2.

There are two special cases: when p=2 the input data entry is unchanged, corresponding to ordinary training without saturation; the extreme case is when p→∞, g becomes a sign function, which means the input domain is binarized.

In some embodiments, the saturation function is defined by:

sigmoid($x$)=1/(1+exp(-$x$))

f_alpha($x$)=sigmoid(alpha*($x$-0.5))

saturation_alpha($x$)=(f_alpha($x$)-0.5)/(1-2*sigmoid(-alpha*0.5))+0.5 or $$g_\alpha(x) = \frac{f_\alpha(x) - 0.5}{1 - 2*S(-\alpha*0.5)} + 0.5$$

where $$f_\alpha(x) = S(\alpha*(x - 0.5))$$

$$S(x) = \frac{1}{1 + e^{-x}}$$

As α increases, the further the input data is pushed to the corners.

The platform 100 builds a robust DNN 112 by coupling the push-to-corner preprocessing with adversarial training. Adversarial training is a process that includes adversarial attacks in the training data for the DNN 112.

The preprocessing layer may also be referred to as a saturation layer. In some embodiments, the training engine 114 pre-processes input data through the saturation function g(X). The training engine 114 uses the DNN 112 to compute output data by a forward pass f(g(X)). The training engine 114 back propagates the gradients to the output data to generate an adversarial attack x_adv. The adversarial attack x_adv can be provided to the DNN 112 for training. The training engine 114 adds the preprocessing or saturation layer which provides better robustness performance for generating security alerts 116. Backpropagation is a method used for neural networks 112 to calculate a gradient that is used for the calculation of the weights used in the network. It is used to train DNNs 112, for example.

The platform 100, in some embodiments, can be integrated as part of an information management and database system that maintains data storage of neural networks, and processes neural networks for transformation into more robust neural networks. Data structures are initialized, allocated, and maintained for storing the neural networks.

For example, the platform 100 of some embodiments is configured to output a trained neural network for provisioning onto a target entity 140 or to generate visual representations on an interface application 130. The output, for example, can include a data payload encapsulating the trained neural network data structure, populated with the trained neural network, among others. The encapsulated data payload may be provided in the form of an electronic file transfer message, fixated on a physical, non-transitory storage medium, among others.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 150.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Figure 2:
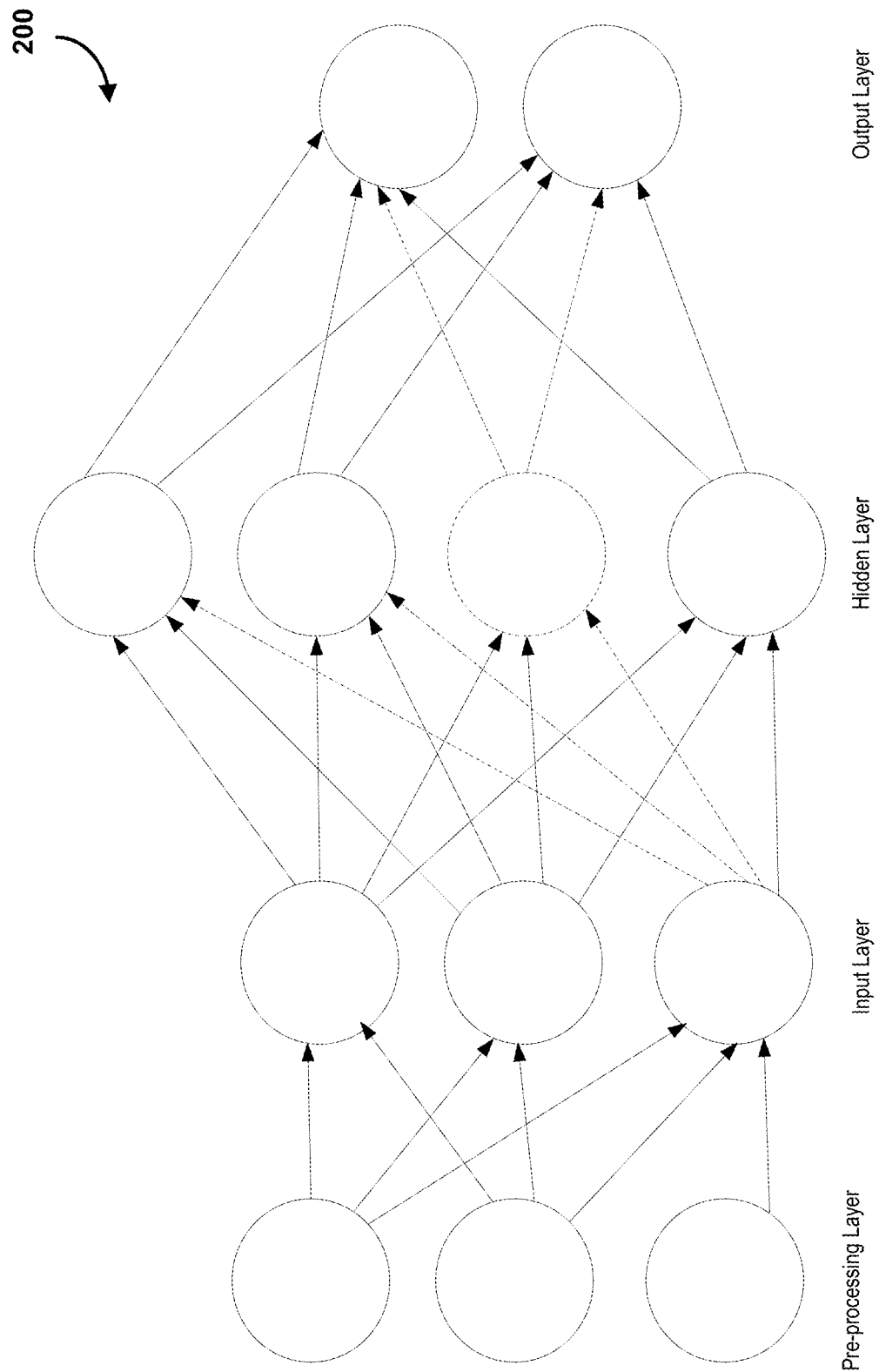
FIG. 2 is a schematic diagram of an example neural network according to some embodiments.

FIG. 2 is a schematic diagram of an example neural network 200 according to some embodiments. The example neural network 200 can be a DNN. The example neural network 200 can include a preprocessing (or saturation) layer for implementing push-to-corner preprocessing. Accordingly, in this example, the neural network includes a pre-processing layer, an input layer, a hidden layer, and an output layer.

In some embodiments, the pre-processing or saturation layer is a software and/or hardware function programmed to perform an input space saturation on the input data before inputting it into the inputs of the neural network.

The platform 100 builds a robust DNN 112 by coupling the push-to-corner preprocessing with adversarial training. Adversarial training is a process that includes adversarial attacks into the training data for the DNN 112.

Figure 3:
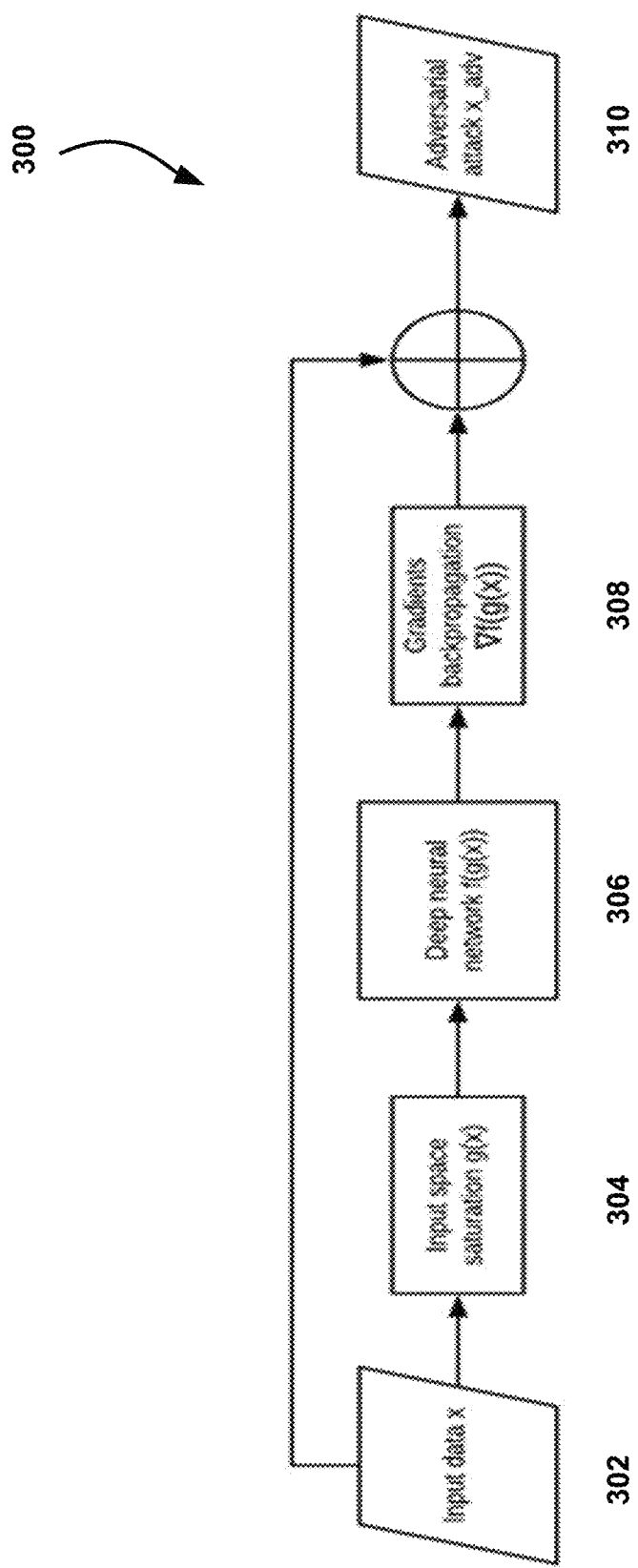
FIG. 3 is a block diagram of an example process for generating adversarial attacks based on a push-to-corner process.

FIG. 3 is a block diagram of an example process 300 for generating adversarial attacks based on a push-to-corner process. The process 300 can be implemented by training engine 114 to generate training data for training neural networks 112.

There may be more, different, alternative, or varied steps, in various orders and the following steps are shown as a non-limiting example.

An original neural network 112 model (e.g., a pre-trained neural network) may be provided, accessed, already residing on, or otherwise loaded into the platform 100. This pre-trained neural network is, in some embodiments, not robust enough against certain types of adversarial attacks. The platform 100 adversarially trains the neural network 112 using input data with push-to-corner preprocessing (or saturation).

In some embodiments, the original neural network 10 is defined by the neural networks data stored in one or more memory device. Some environments, the neural networks data includes data defining nodes, weights, and arrangements of those nodes in one or more layers. In some embodiments, the nodes are configured to receive a set of inputs and to generate one or more of outputs based on the inputs.

At 302, platform 100 receives training input data set. In some embodiments, the training input data can represent image data, audio data, medical data, user profile data, and/or the like. In some embodiments, the input data set can be received as an array, matrix, and/or stream of data.

At 304, the processors are configured to transform the training input data set with a saturation function such as those described herein. In some embodiments, the saturation function transforms the training input data set to generate a saturated data set with the values of the training input data sets being pushed towards corners of their input domains.

Figure 4:
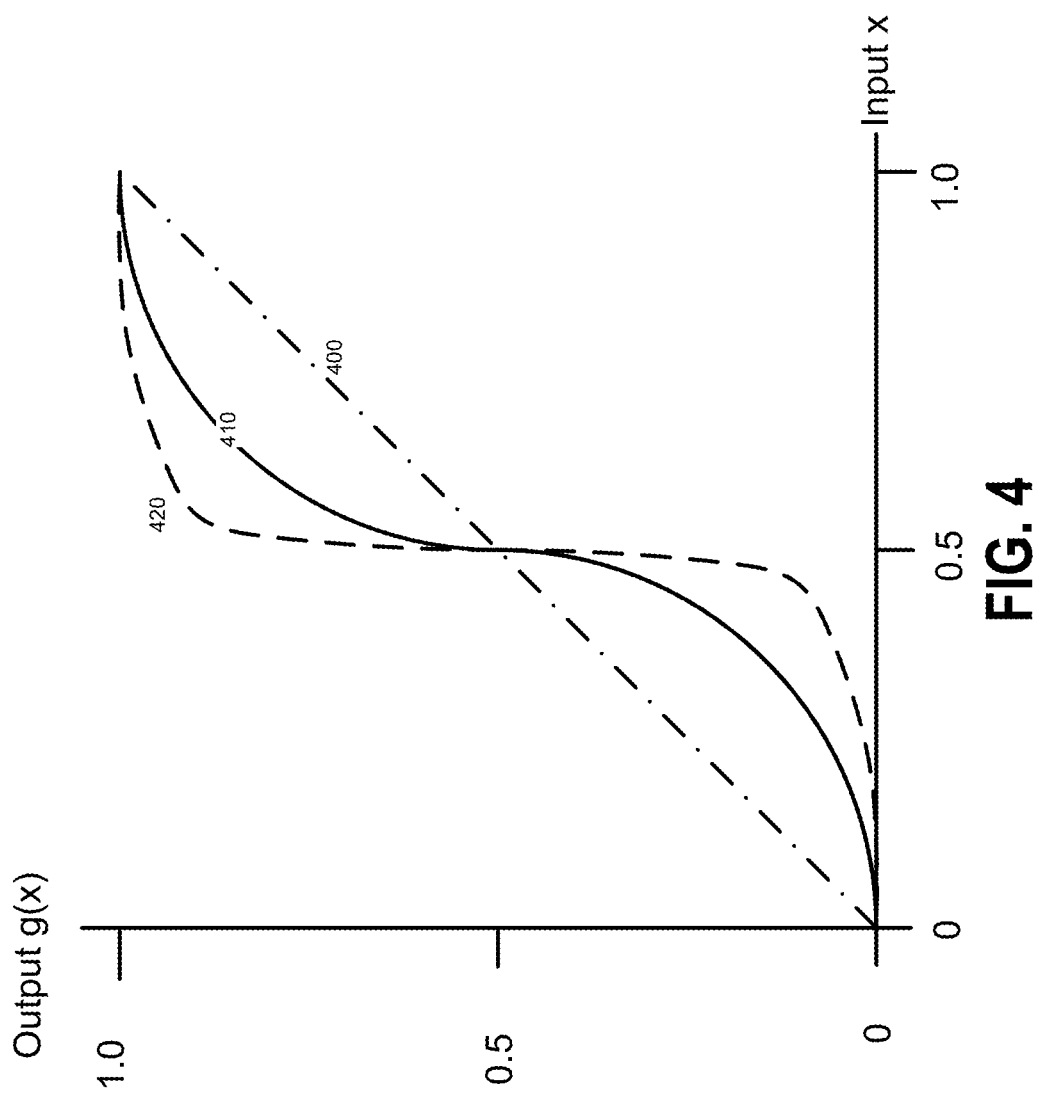
FIG. 4 is a graph showing example transformation functions.

For example, FIG. 4 shows an example of three transformation functions. The dash-dotted line 400 represents no transformation where the input which has a domain of (0,1) is the same as the output. The solid line 410 represents a transformation function which pushes the inputs below 0.5 towards 0, and the inputs above 0.5 towards 1. The dashed line 420 represents a second transformation which is similar to 410 but pushes the values even further to the corners of their domains.

In some embodiments, the transformation functions are monotonic as illustrated by the functions for lines 410 and 420.

At 306, the processors input the saturated data set into the neural network and at 308, generate saturated data backpropagation gradients. In some embodiments, the platform 100 computes output data by a forward pass f(g(X)) of the input space saturation through the DNN 112 and computes backpropagation gradients based on differences between the one or more outputs of the neural network and the expected values for the input data.

At 310, the processors generate a second training data set (e.g. an adversarial attack training data set) based on the saturated data backpropagation gradients and the original input data set. In some embodiments, generating the second training data set includes performing gradient descent on the inputs data with the backpropagation gradients.

In some embodiments, the processors add a scaled gradient and add it to the input data. In some embodiments, this is repeated n times to generate the second training data set. In some embodiments, n can be any number with higher numbers providing more robustness but requiring longer computation time.

The second training data set (e.g. adversarial attack x_adv) can be provided to the DNN 112 for training.

In some embodiments, the neural network trained on the second training data set is stored in one or more data structures as trained neural network data. The trained neural network data can define the nodes, weights, layers, etc. of the trained neural network.

The process adds the saturation layer which provides better robustness performance.

Experimental Results

Embodiments described herein generated experimental results based on a Wide ResNet with 28 layers and widen factor of four. The neural network was trained on the CIFAR-10 dataset. Adversarial training was conducted with projected gradient descent (PGD) method. Attacks were generated with fast gradient sign method (FGSM) and PGD. Table 1 shows the test accuracy on unperturbed data, as well as FGSM- and PGD-perturbed data. Note that p=2 corresponds to the ordinary training. In this example, it was seen that by adding the saturation layer, the model exhibits higher accuracy on perturbed data, and therefore becomes more robust. However, its test accuracy on the original, unperturbed data might be reduced.

|  | Unperturbed | FGSM eps = 8 | PGD eps = 8, steps = 7 |
| --- | --- | --- | --- |
| p = 2 (ordinary) | 86.73% | 56.53% | 47.24% |
| p = 8 | 80.96% | 71.76% | 63.45% |
| p = 32 | 80.85% | 70.47% | 55.64% |
| p = 128 | 80.74% | 68.29% | 51.20% |
| p = 256 | 80.17% | 67.23% | 47.75% |
| p = 512 | 80.88% | 70.38% | 55.87% |
| p = inf | 80.21% | 80.21% | 79.59% |

In some embodiments, the neural network can be trained on both the second training data set (e.g. the training data generated using the saturation layer) as well as the original training data set. In some embodiments, this may increase the accuracy of the system on unperturbed data. However, in some situations, this may decrease the robustness of the system to resist adversarial attacks.

In some embodiments, using one or more hyperparameters or otherwise, the system can be configured to apply a greater weight to the training of the neural network with the second training data set then the weight applied to the training of the neural network with the first training set to bias the system to being more robust; or vice versa to bias the system to being more accurate.

The trained neural networks 112 may be used in a variety of applications in neural systems in mobile and portable devices. The model may be implemented in tangible, concrete forms of computer-implemented systems, methods, devices, and computer-readable media storing machine readable instructions thereof. For example, the system may operate in the form of computer implemented devices in a data center hosting a cluster of devices used for maintaining data sets representative of the neural network. A hosted application, or a dedicated hardware or server device may be provided to perform steps of a computer implemented method for using adversarial training to develop neural networks 112 for generation of security alerts 112. The neural network may be prepared for loading onto a mobile device or a resource limited device, such as an FPGA, a smartphone, tablet, among others.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

As can be understood, the examples described above and illustrated are intended to be exemplary only.

What is claimed is:

1. A computer implemented system for conducting machine learning with adversarial training, the system comprising:
   at least one memory for storing neural network data for defining a neural network having a plurality of nodes in a plurality of layers, the plurality of nodes configured to receive an plurality of inputs and to generate one or more outputs based on the neural network data;
   at least one processor configured for:
     receiving a first training input data set for training the neural network;
     transforming the first training input data set with a saturation function to generate a saturated data set with values pushed toward corners of domains of the input data set;
     inputting the saturated data set into the neural network and generating saturated data backpropagation gradients based on the resulting one or more outputs of the neural network; and
     generating a second training data set based on the training input data set and the saturated data backpropagation gradients.

2. The computer implemented system of claim 1, wherein the domains of the input data set are from X to Y, the saturation function pushes values in the input data set which are less than 0.5*(Y–X) closer to X, and values in the input data set which are greater than 0.5*(Y–X) closer to Y.

3. The computer implemented system of claim 1 wherein the saturation function pushes values in the input data set towards a corner of a high dimensional space domain of the input data set.

4. The computer implemented system of claim 1, wherein the saturation function is defined by g(X):

$$g(x) = \text{sign}(x)|x|^{\frac{2}{p}}$$

where x is an input value to be saturated and p is an integer greater than 2.

5. The computer implemented system of claim 1, wherein the saturation function is defined by g(X):

$$g_\alpha(x) = \frac{f_\alpha(x) - 0.5}{1 - 2*S(-\alpha*0.5)} + 0.5$$

where $$f_\alpha(x) = S(\alpha*(x-0.5))$$

$$S(x) = \frac{1}{1+e^{-x}}$$

and α is greater than 0.

6. The computer implemented system of claim 1, wherein the at least one processor is configured for:

training the neural network with the second training data set; and storing second neural network data, the second neural network data defining the neural network trained with the second training data set.

7. The computer implemented system of claim 1, wherein the at least one processor is configured for: training the neural network with the second training data set and the first training data set.

8. The computer implemented system of claim 1, wherein the at least one processor is configured for: weighting the training of the neural network such that the training with one of the first and the second training data set is more heavily weighted than and the training with the other of the first and second training data set.

9. The computer implemented system of claim 1, wherein the at least one processor is configured for: providing the second training data set as an input to a second neural network.

10. The computer implemented system of claim 1, wherein the first training data set represents image data, audio data, medical data or user profile data.

11. A computer implemented method for conducting machine learning with adversarial training, the method comprising:

receiving a first training input data set for training a neural network defined by neural network data stored in at least one memory, the neural network having a plurality of nodes in a plurality of layers, the plurality of nodes configured to receive an plurality of inputs and to generate one or more outputs based on the neural network data;

transforming, with at least one processor, the first training input data set with a saturation function to generate a saturated data set with values pushed toward corners of domains of the input data set;

inputting the saturated data set into the neural network and generating, with the at least one processor, saturated data backpropagation gradients based on the resulting one or more outputs of the neural network; and generating, with the at least one processor, a second training data set based on the training input data set and the saturated data backpropagation gradients.

12. The computer implemented method of claim 11, wherein the domains of the input data set are from X to Y, the saturation function pushes values in the input data set which are less than 0.5*(Y−X) closer to X, and values in the input data set which are greater than 0.5*(Y−X) closer to Y.

13. The computer implemented method of claim 11 wherein the saturation function pushes values in the input data set towards a corner of a high dimensional space domain of the input data set.

14. The computer implemented method of claim 11, wherein the saturation function is defined by g(X):

$$g(x) = \text{sign}(x)|x|^{\frac{2}{p}}$$

where x is an input value to be saturated and p is an integer greater than 2.

15. The computer implemented method of claim 11, wherein the saturation function is defined by g(X):

$$g_\alpha(x) = \frac{f_\alpha(x) - 0.5}{1 - 2*S(-\alpha*0.5)} + 0.5$$

where $$f_\alpha(x) = S(\alpha*(x-0.5))$$

$$S(x) = \frac{1}{1+e^{-x}}$$

and α is greater than 0.

16. The computer implemented method of claim 11, comprising:

training the neural network with the second training data set; and storing second neural network data, the second neural network data defining the neural network trained with the second training data set.

17. The computer implemented method of claim 11, comprising: training the neural network with the second training data set and the first training data set.

18. The computer implemented method of claim 11, comprising: weighting the training of the neural network such that the training with one of the first and the second training data set is more heavily weighted than and the training with the other of the first and second training data set.

19. The computer implemented method of claim 11, comprising: providing the second training data set as an input to a second neural network.

20. A non-transitory computer-readable medium or media having stored thereon neural network data defining a neural network having a plurality of nodes in a plurality of layers, the plurality of nodes configured to receive an plurality of inputs and to generate one or more outputs based on the neural network data, the neural network trained on a training data set generated by:

transforming an input data set with a saturation function to generate a saturated data set with values pushed toward corners of domains of the input data set;

inputting the saturated data set into the neural network and generating saturated data backpropagation gradients based on the resulting one or more outputs of the neural network; and generating the training data set based on the input data set and the saturated data backpropagation gradients.

* * * * *